(12) United States Patent
Takahashi et al.

(10) Patent No.: US 8,299,980 B2
(45) Date of Patent: Oct. 30, 2012

(54) IMAGE DISPLAY DEVICE

(75) Inventors: Takehiro Takahashi, Yokohama (JP); Isao Tomisawa, Kawasaki (JP); Masaru Ishikawa, Kiyose (JP)

(73) Assignee: Pioneer Corporation, Tokyo (JP)

( * ) Notice: Subject to any disclaimer, the term of this patent is extended or adjusted under 35 U.S.C. 154(b) by 225 days.

(21) Appl. No.: 12/674,521

(22) PCT Filed: Aug. 22, 2007

(86) PCT No.: PCT/JP2007/066232
§ 371 (c)(1),
(2), (4) Date: Apr. 5, 2010

(87) PCT Pub. No.: WO2009/025034
PCT Pub. Date: Feb. 26, 2009

(65) Prior Publication Data
US 2011/0037682 A1   Feb. 17, 2011

(51) Int. Cl.
*G09G 5/00*   (2006.01)
(52) U.S. Cl. ............................... 345/4; 345/6
(58) Field of Classification Search ............. 345/4–9, 345/32, 58, 108–109, 419
See application file for complete search history.

(56) References Cited

U.S. PATENT DOCUMENTS

| | | | | |
|---|---|---|---|---|
| 6,317,037 B1 * | 11/2001 | Ayres et al. | ............... | 340/461 |
| 6,525,699 B1 * | 2/2003 | Suyama et al. | ............... | 345/6 |
| 7,148,859 B2 * | 12/2006 | Suyama et al. | ............... | 345/6 |
| 7,636,198 B2 * | 12/2009 | Larson | ............... | 359/629 |
| 7,978,415 B2 * | 7/2011 | Schoenenberger et al. | ... | 359/630 |
| 2003/0067423 A1 * | 4/2003 | Suyama et al. | ............... | 345/6 |
| 2003/0071765 A1 * | 4/2003 | Suyama et al. | ............... | 345/6 |
| 2003/0095079 A1 | 5/2003 | Ishikawa et al. | | |
| 2004/0085643 A1 | 5/2004 | Ishikawa et al. | | |

(Continued)

FOREIGN PATENT DOCUMENTS

JP   5-28699   4/1993
(Continued)

OTHER PUBLICATIONS

International Search Report for PCT/JP2007/066232, mailed Sep. 25, 2007.

(Continued)

*Primary Examiner* — Amare Mengistu
*Assistant Examiner* — Dmitriy Bolotin
(74) *Attorney, Agent, or Firm* — Nixon & Vanderhye P.C.

(57) ABSTRACT

An image display device main roughly includes a floating image display unit 1 and a floating image recognizing unit 2. The floating image displaying unit 1 includes a display unit 10 having an image screen 11 for displaying a two-dimensional image, and an image transfer panel 20 located far from the image screen 11, the floating image display unit 1 being to focus light left from the image screen 11 on an image plane 30 in a space to thereby display a floating image, the space being located on one side of the image transfer panel 20 opposite to the other side thereof facing the display unit 11. The floating image recognizing unit 2 is formed of a light-transmissive plate 40 that is light transmissive. The light-transmissive plate 40 has a size that allows all light left from the image screen 11 and focused on the image plane 30 to be passed therethrough. The light-transmissive plate 40 is placed to be obliquely-crossed to the image plane 30.

8 Claims, 18 Drawing Sheets

U.S. PATENT DOCUMENTS

| | | | |
|---|---|---|---|
| 2007/0070062 A1* | 3/2007 | Boll | 345/419 |
| 2010/0007636 A1* | 1/2010 | Tomisawa et al. | 345/204 |
| 2010/0245345 A1* | 9/2010 | Tomisawa et al. | 345/419 |
| 2010/0283838 A1* | 11/2010 | Tomisawa et al. | 348/51 |

FOREIGN PATENT DOCUMENTS

| | | |
|---|---|---|
| JP | 6-55690 | 8/1994 |
| JP | 2001-255493 | 9/2001 |
| JP | 2003-098479 | 4/2003 |
| WO | WO 2006/061959 | 6/2006 |
| WO | WO 2007/013215 | 2/2007 |

OTHER PUBLICATIONS

Jun. 19, 2012 Notification of Reason for Refusal for JP2009-528908 and at least partial English translation, 5 pages.

* cited by examiner

[FIG.1]
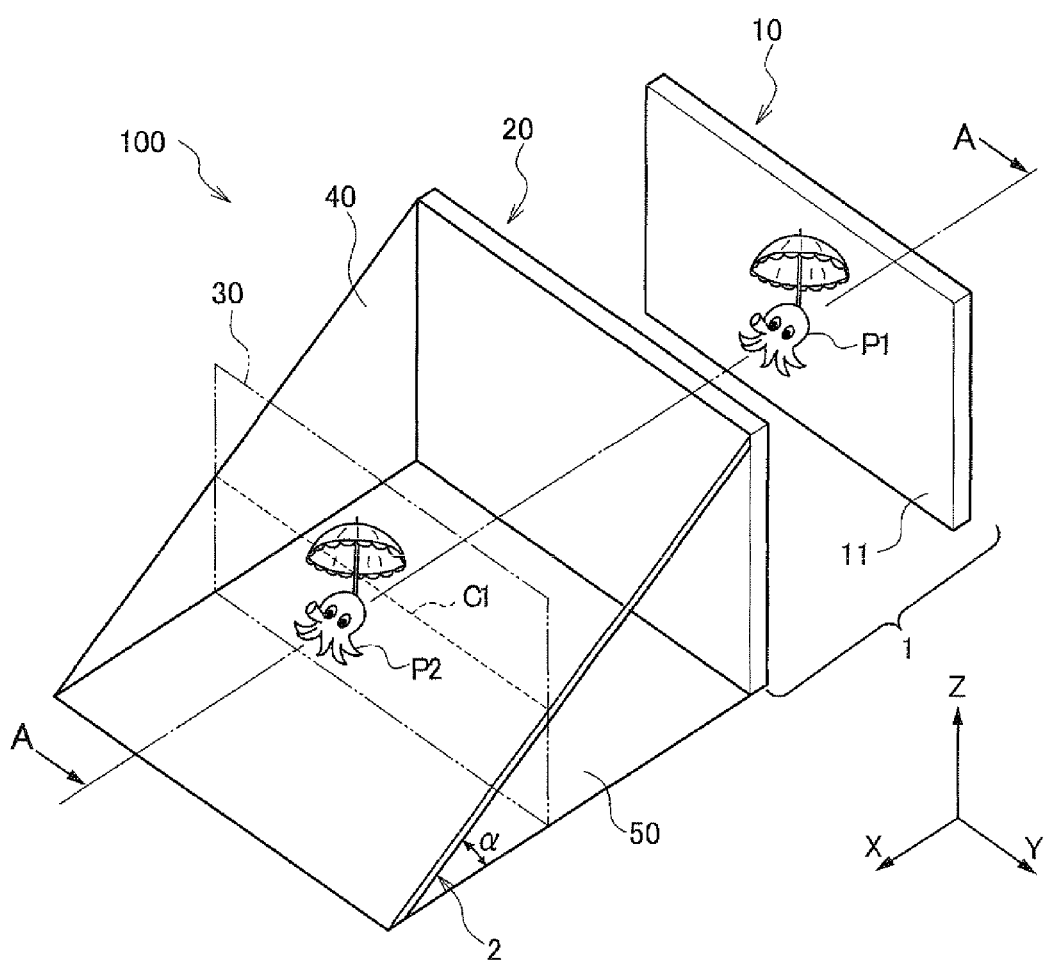

[FIG.2]
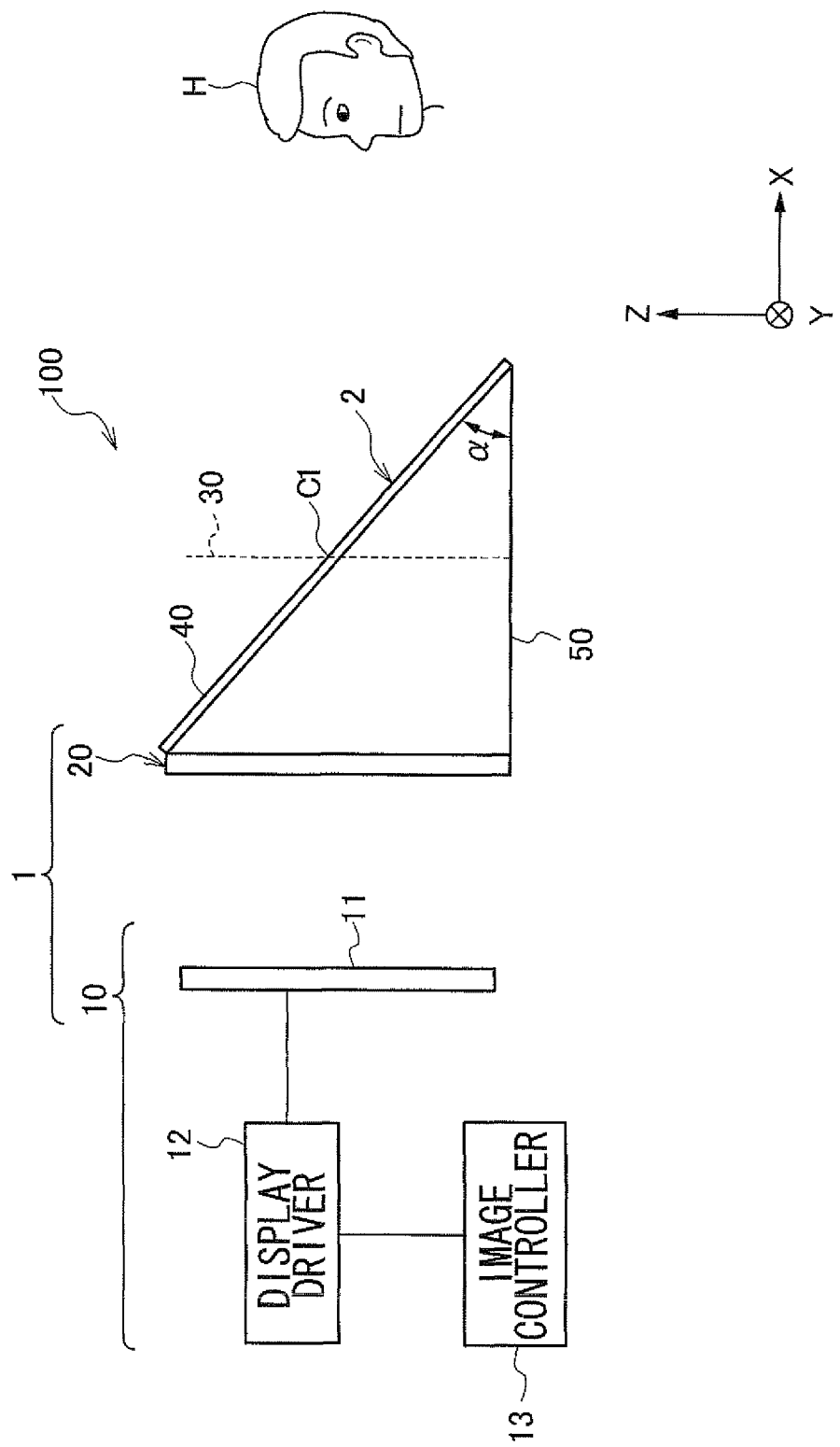

[FIG.3]
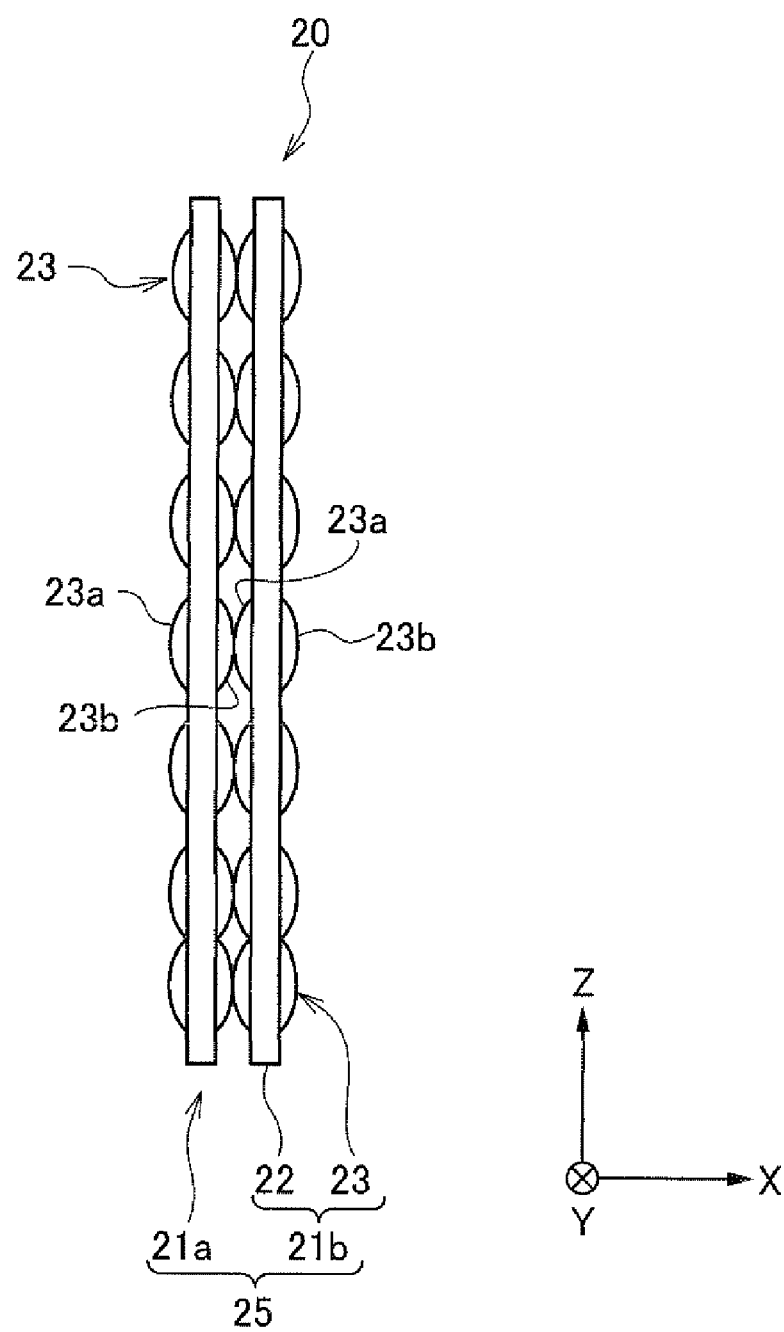

[FIG.4]
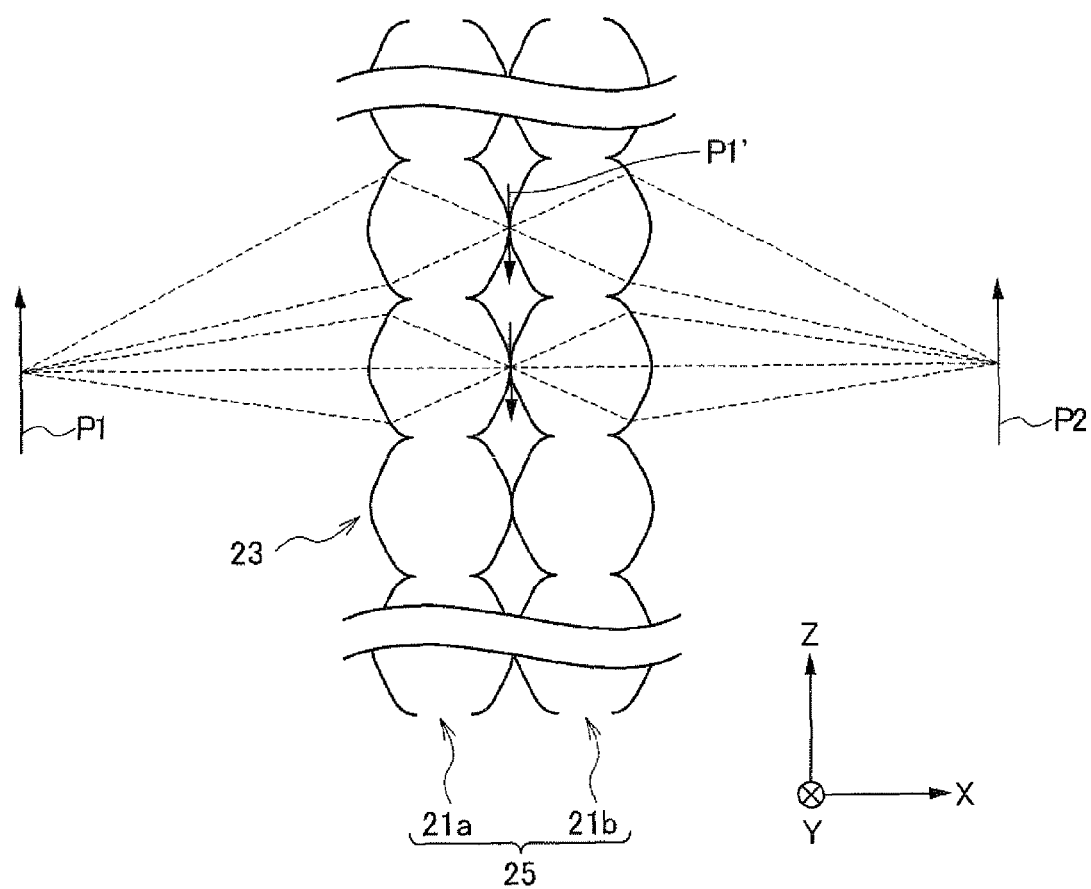

[FIG.5]
(a)
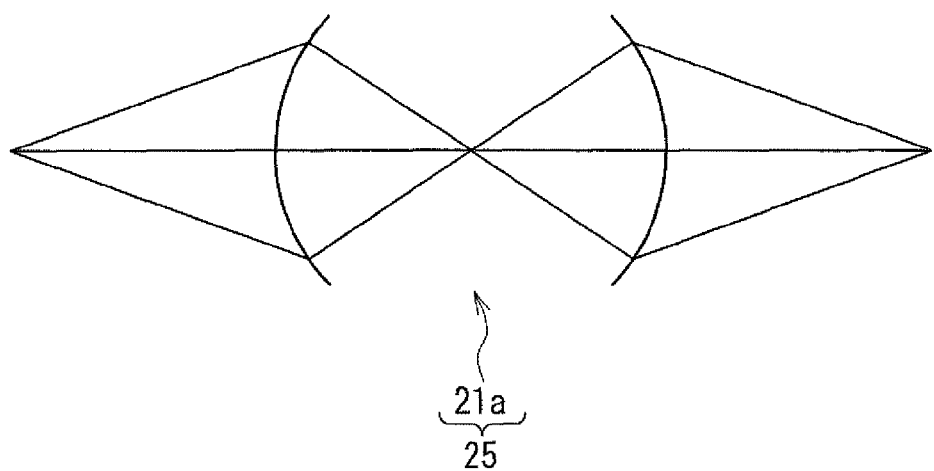
(b)
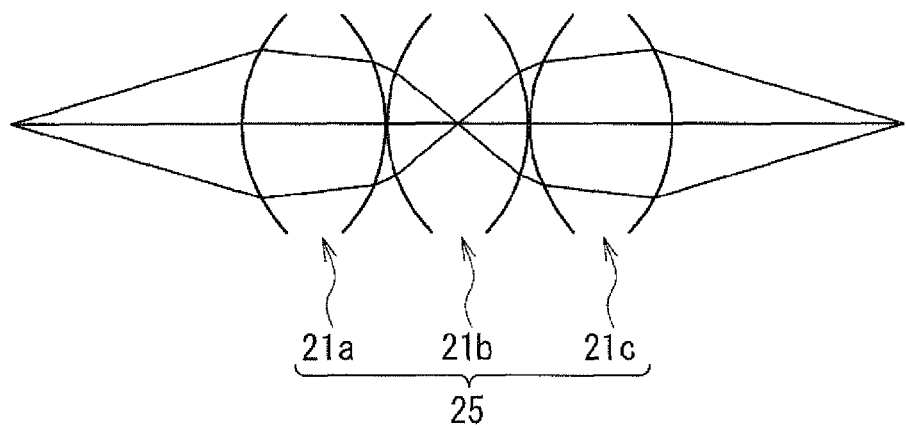

[FIG.6]
(a)
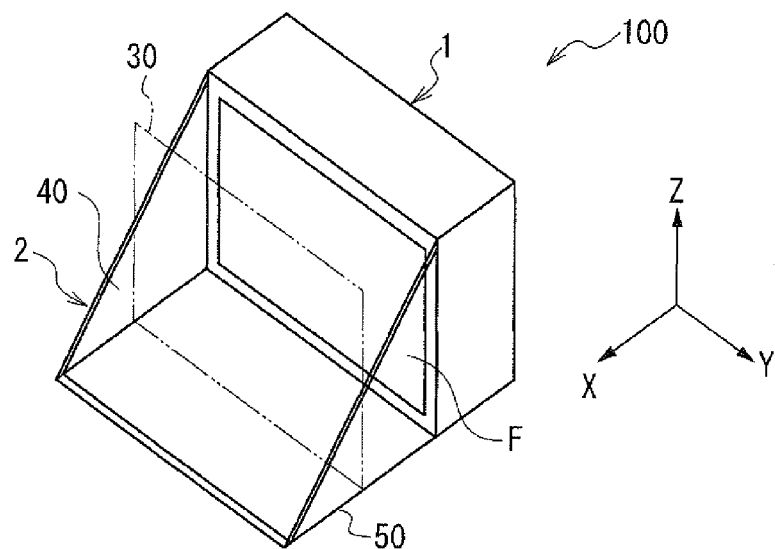
(b)
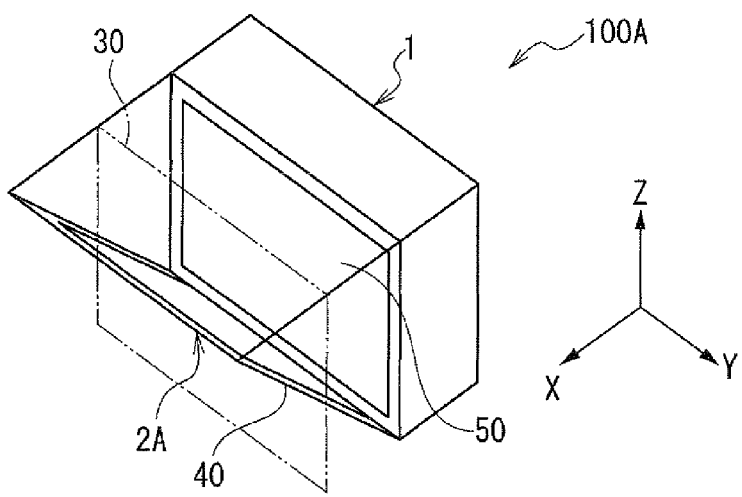
(c)
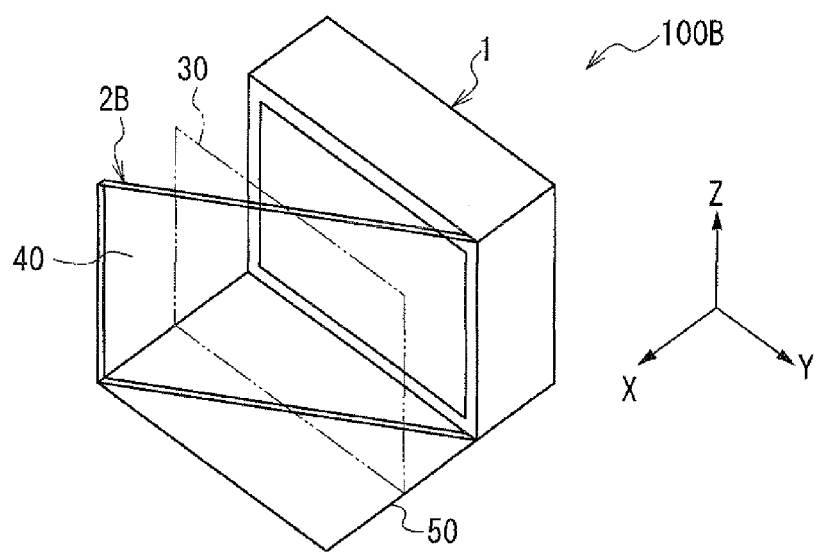

[FIG.7]
(a)
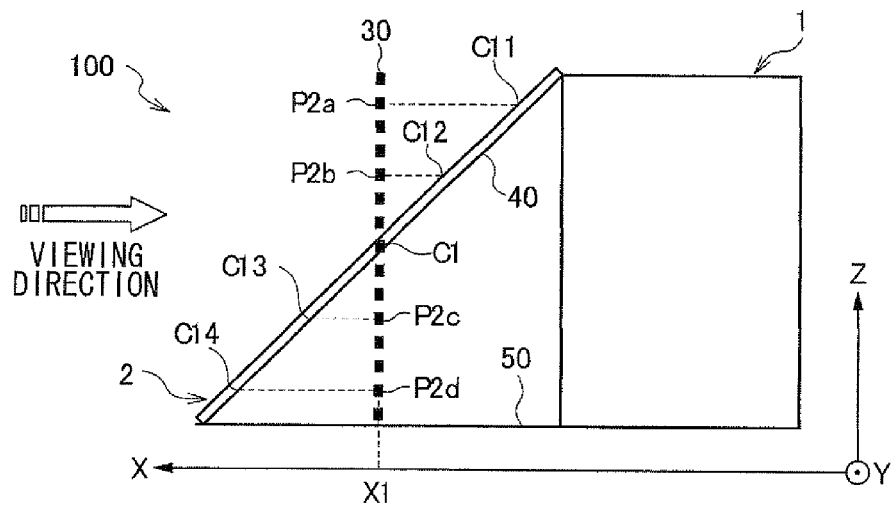
(b)
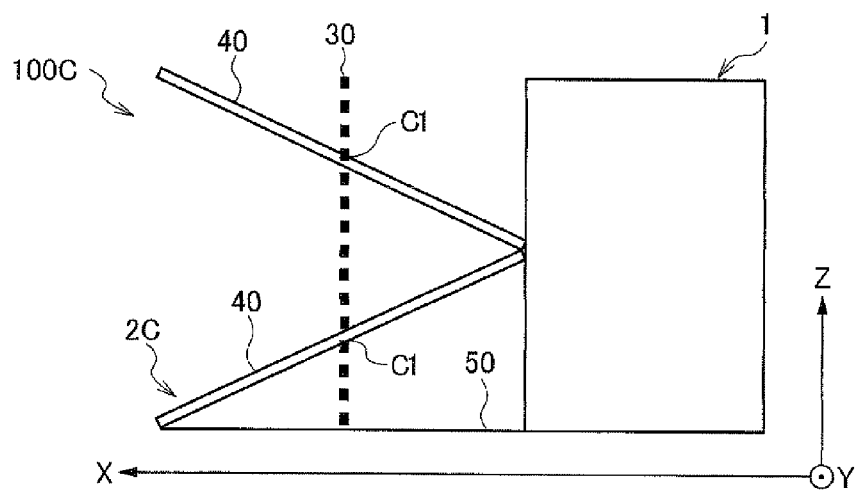
(c)
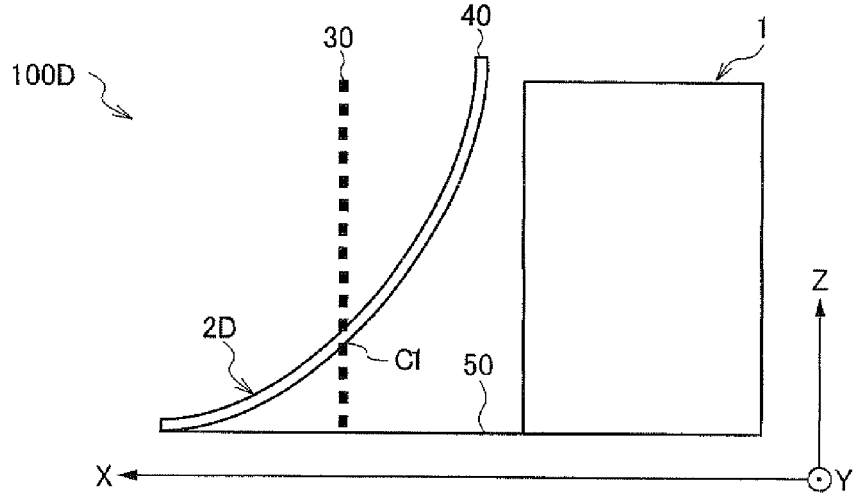

[FIG.8]
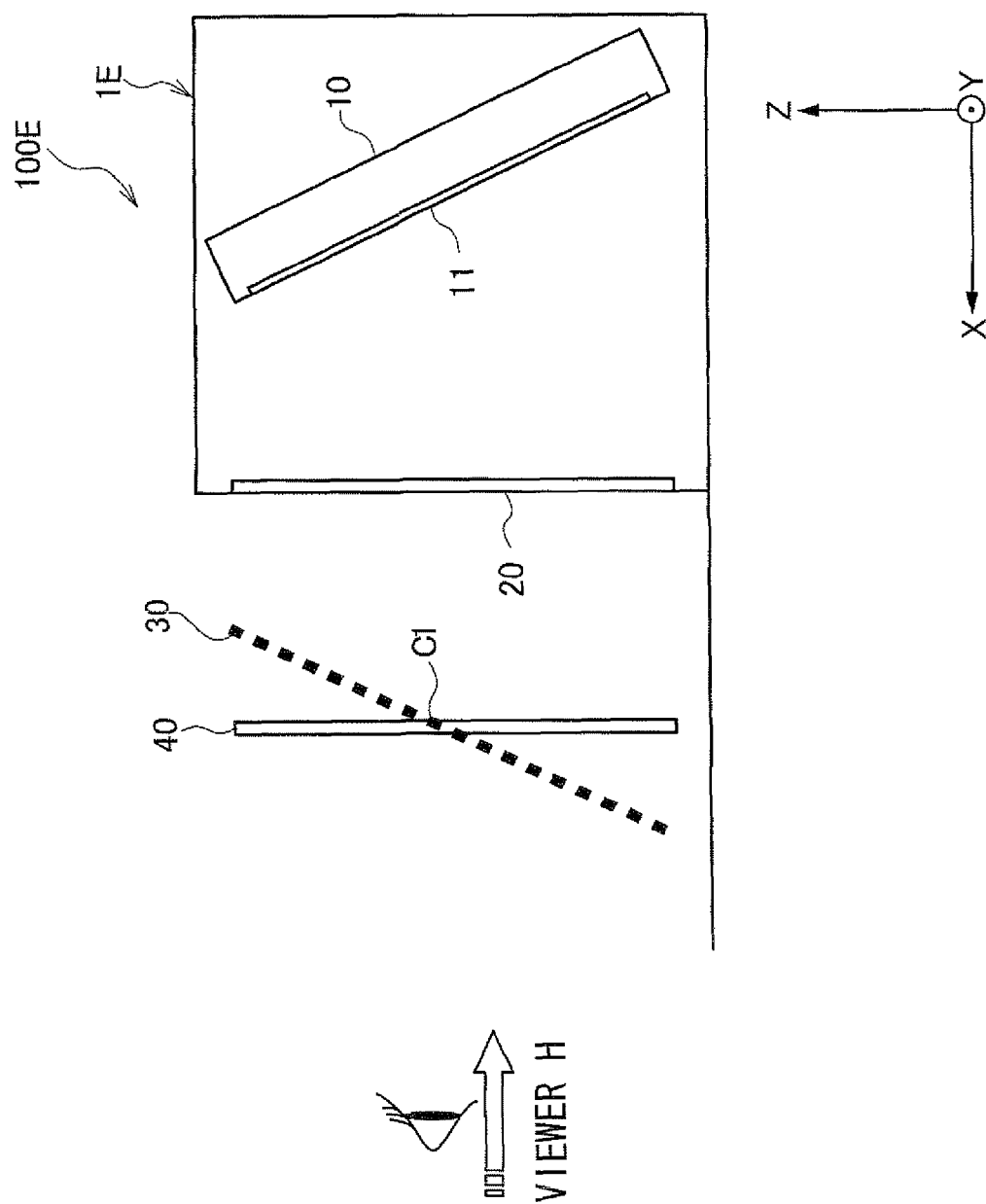

[FIG.9]
(a)
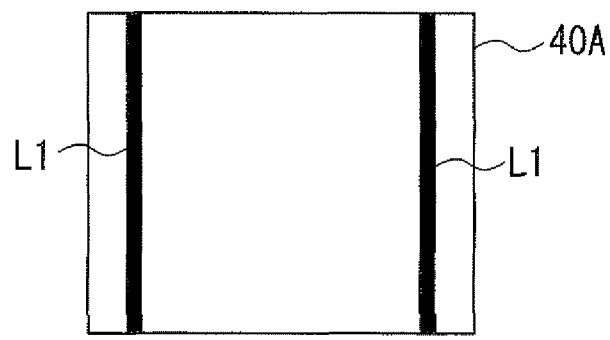
(b)
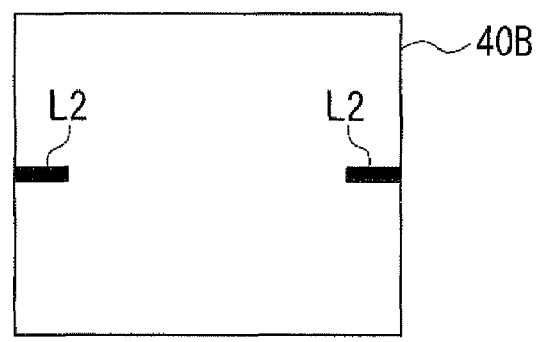
(c)
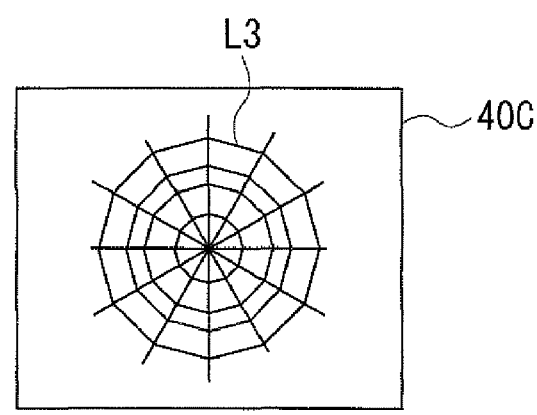

[FIG.10]
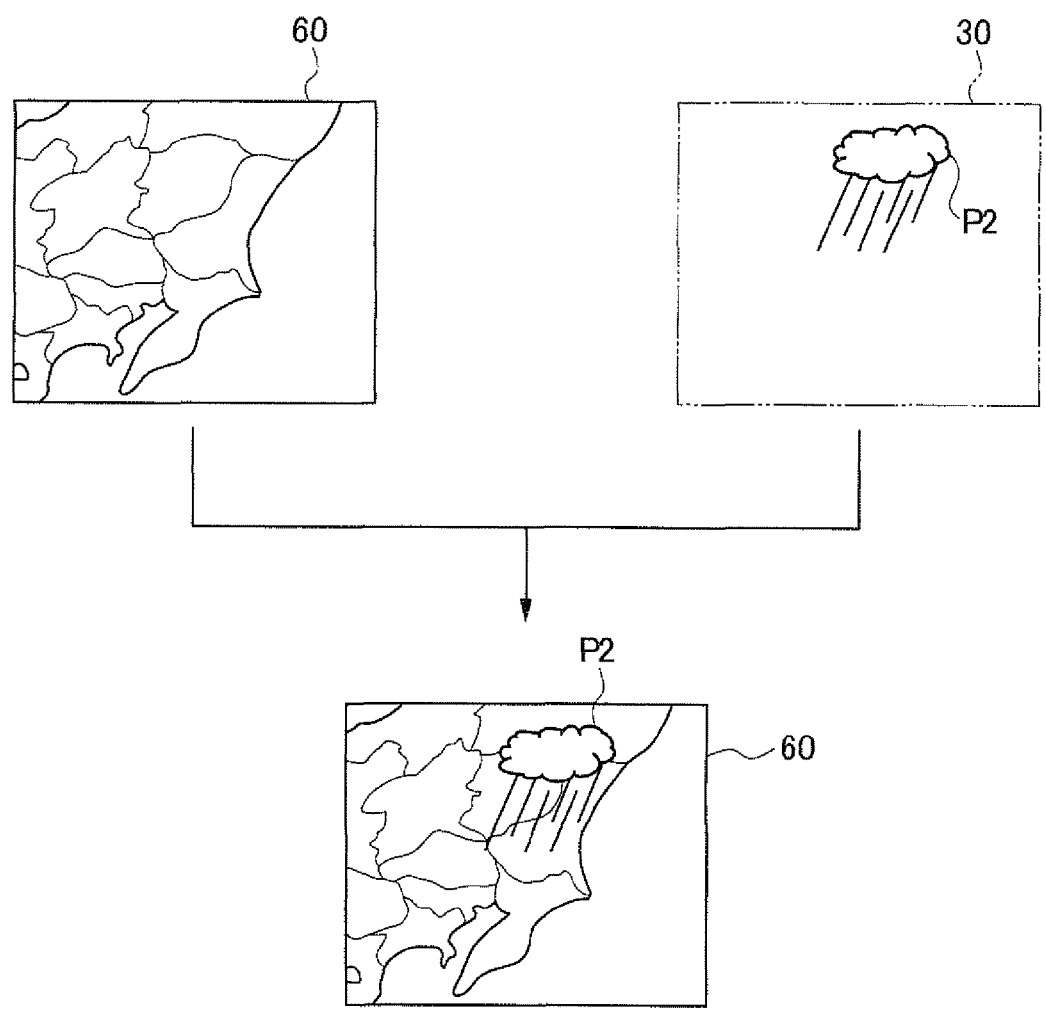

[FIG.11]
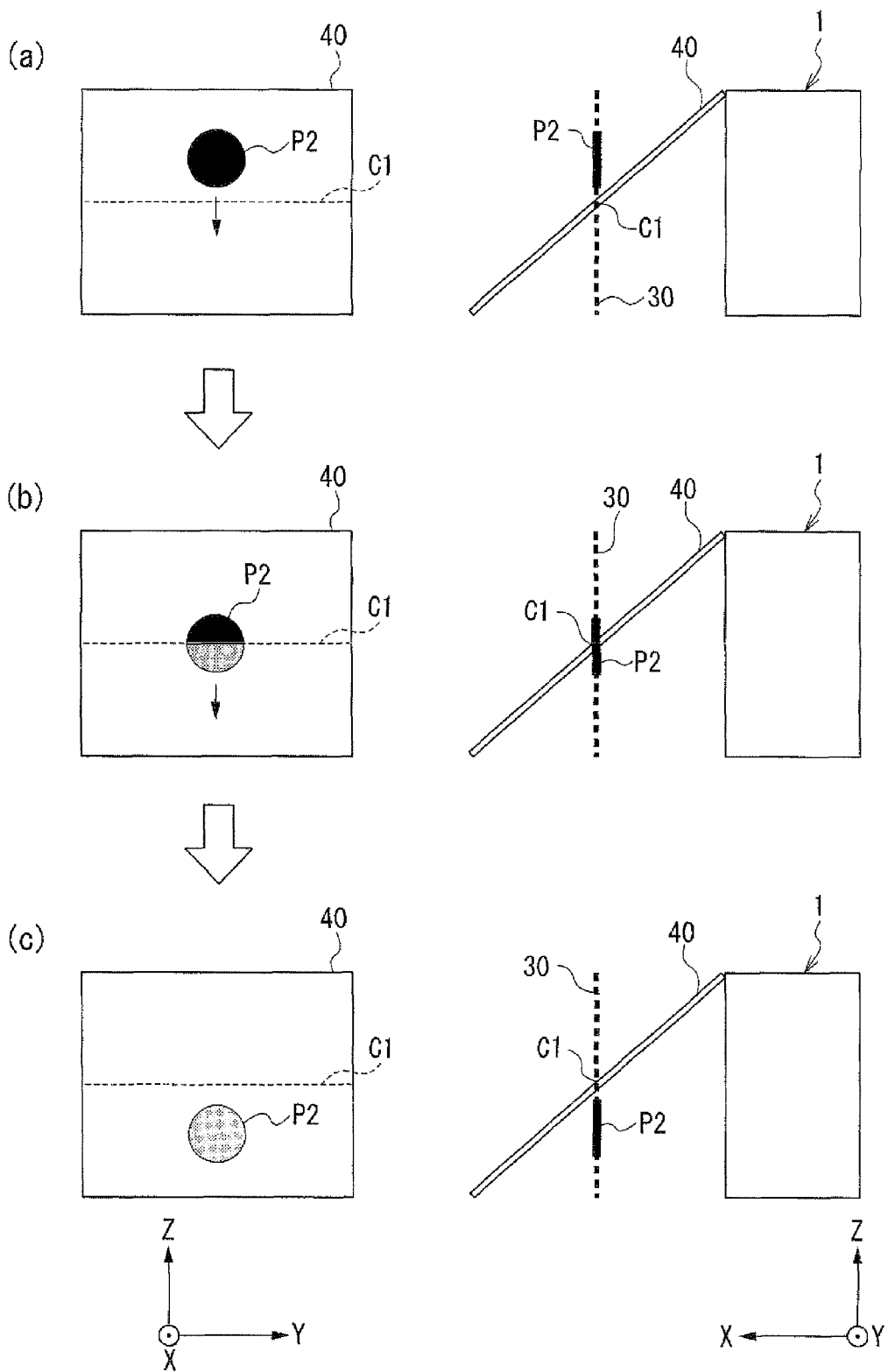

[FIG.12]
(a)
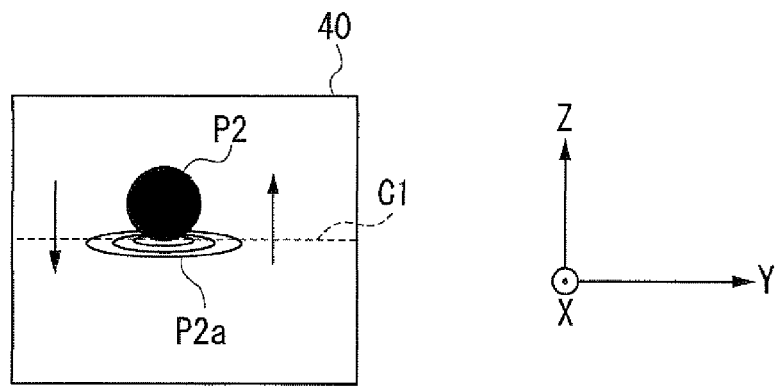
(b)
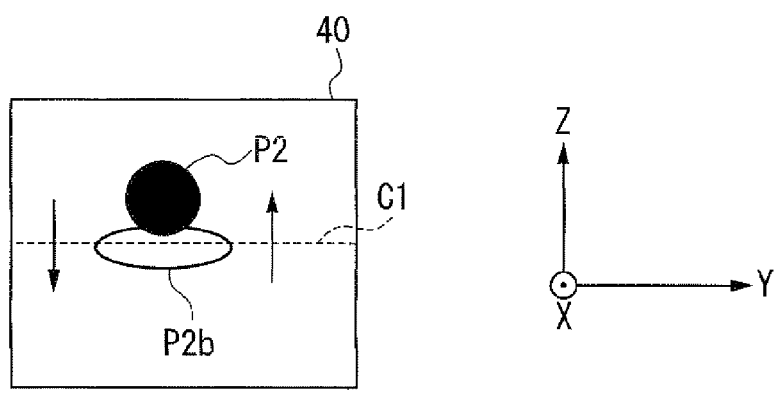
(c)
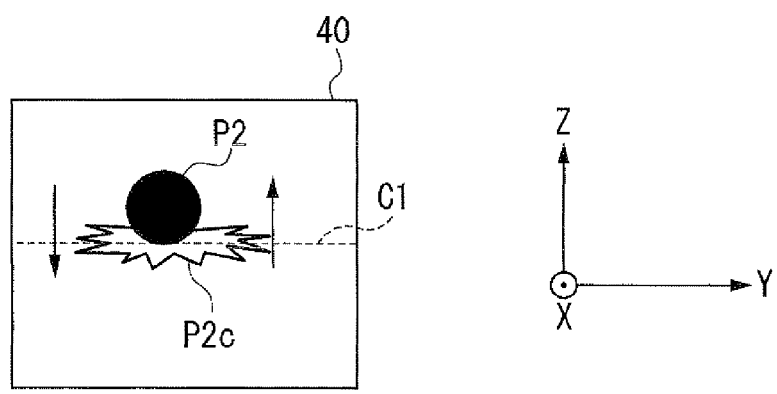

[FIG.13]
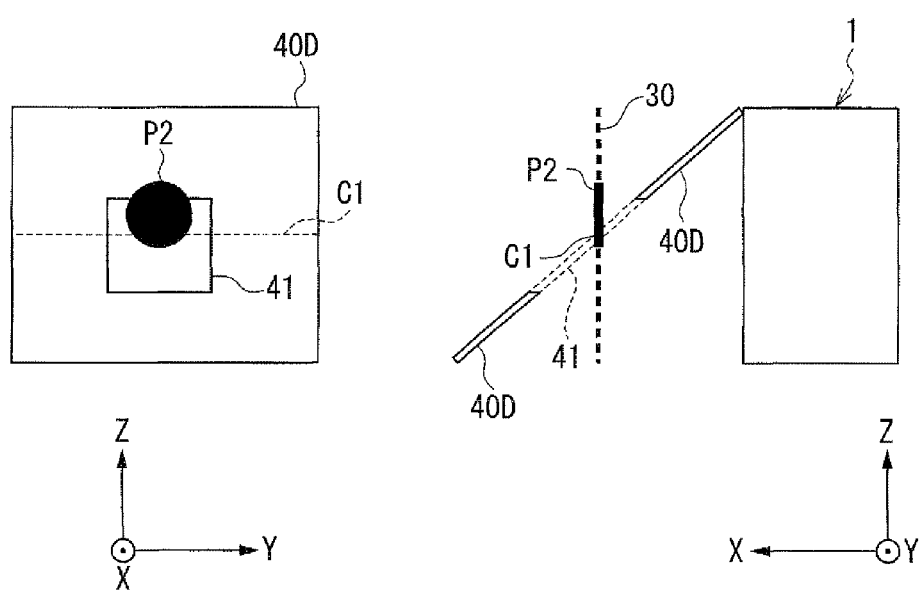

[FIG.14]
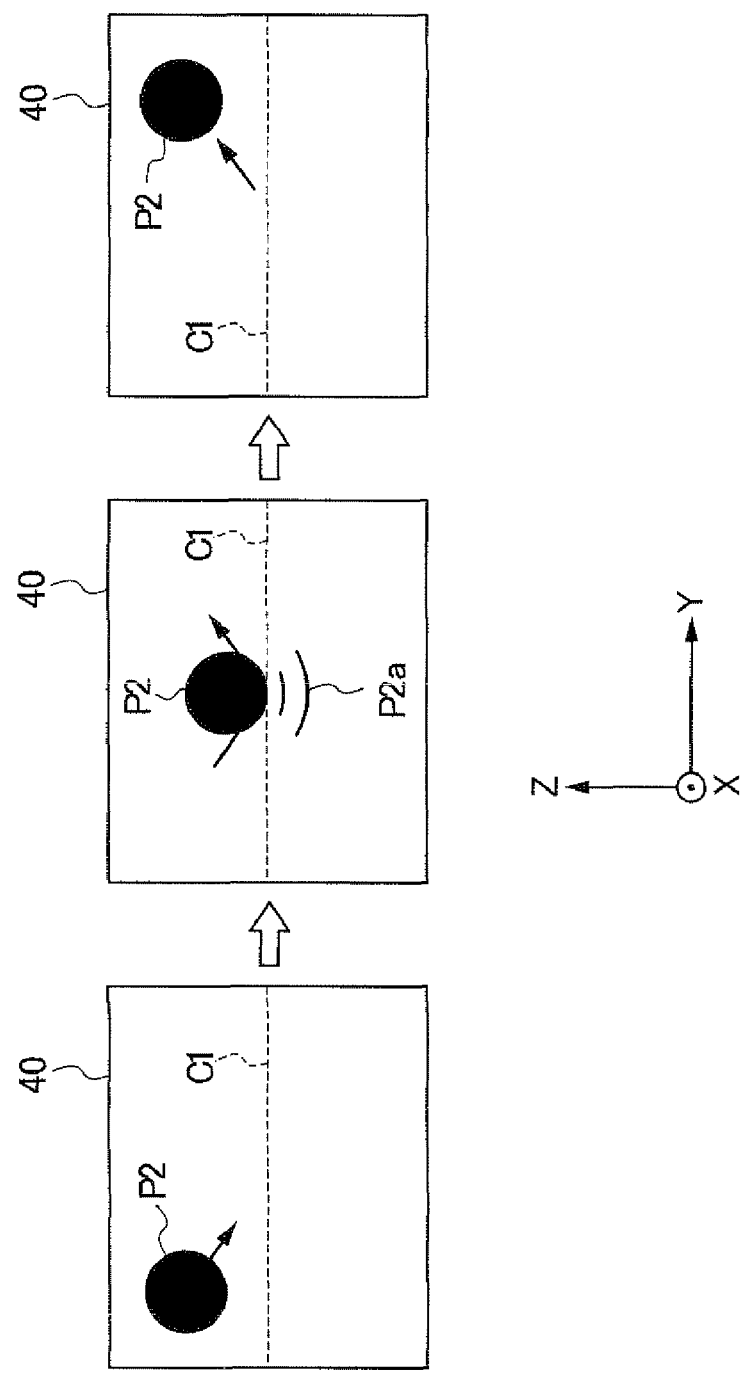

[FIG.15]
(a)
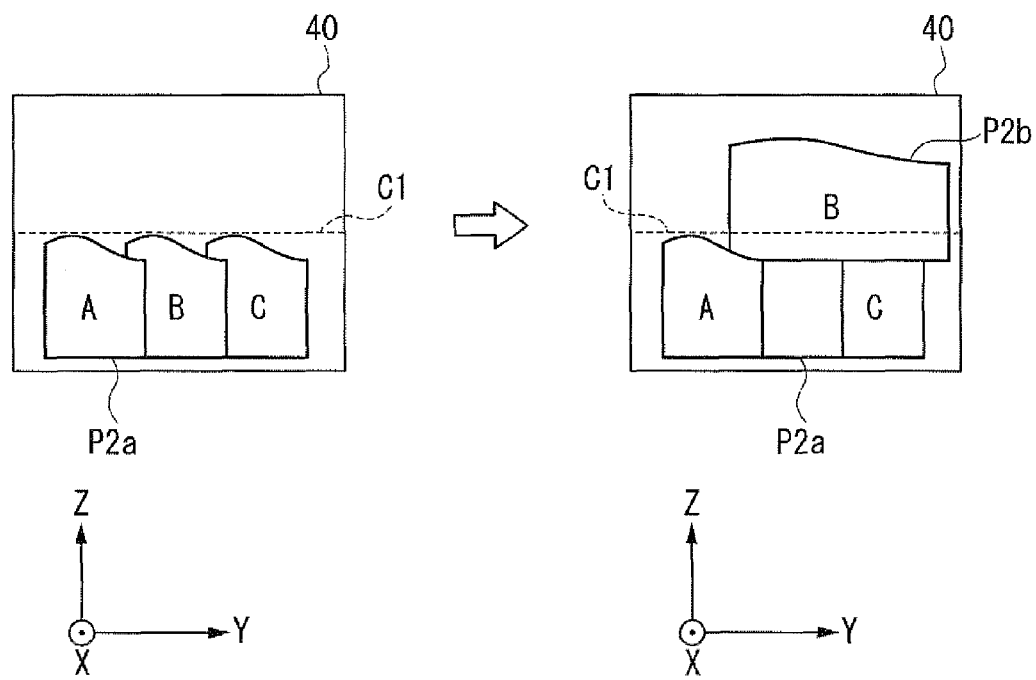
(b)
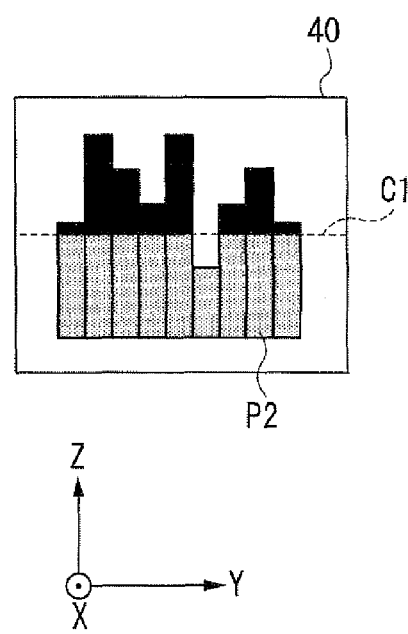

[FIG.16]
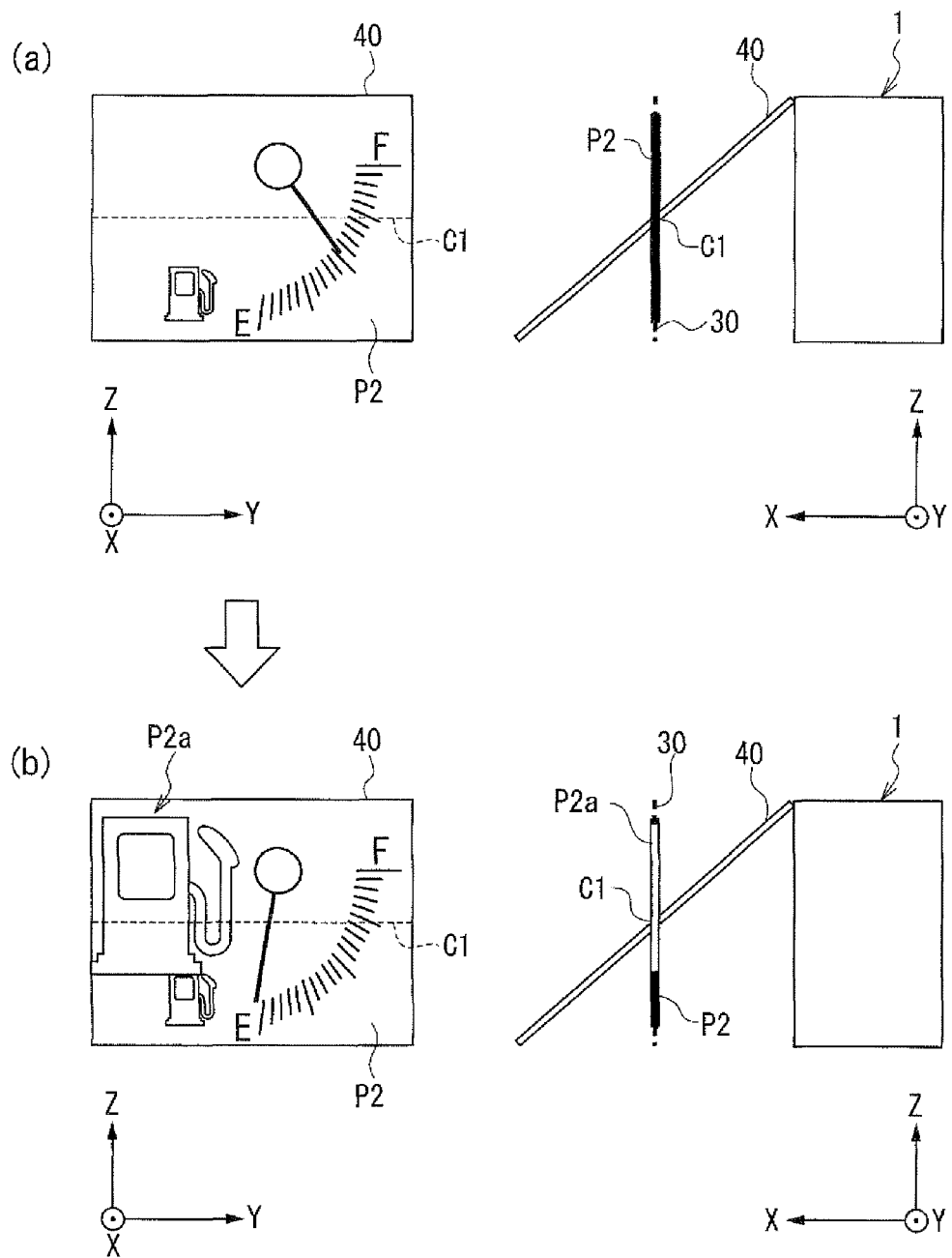

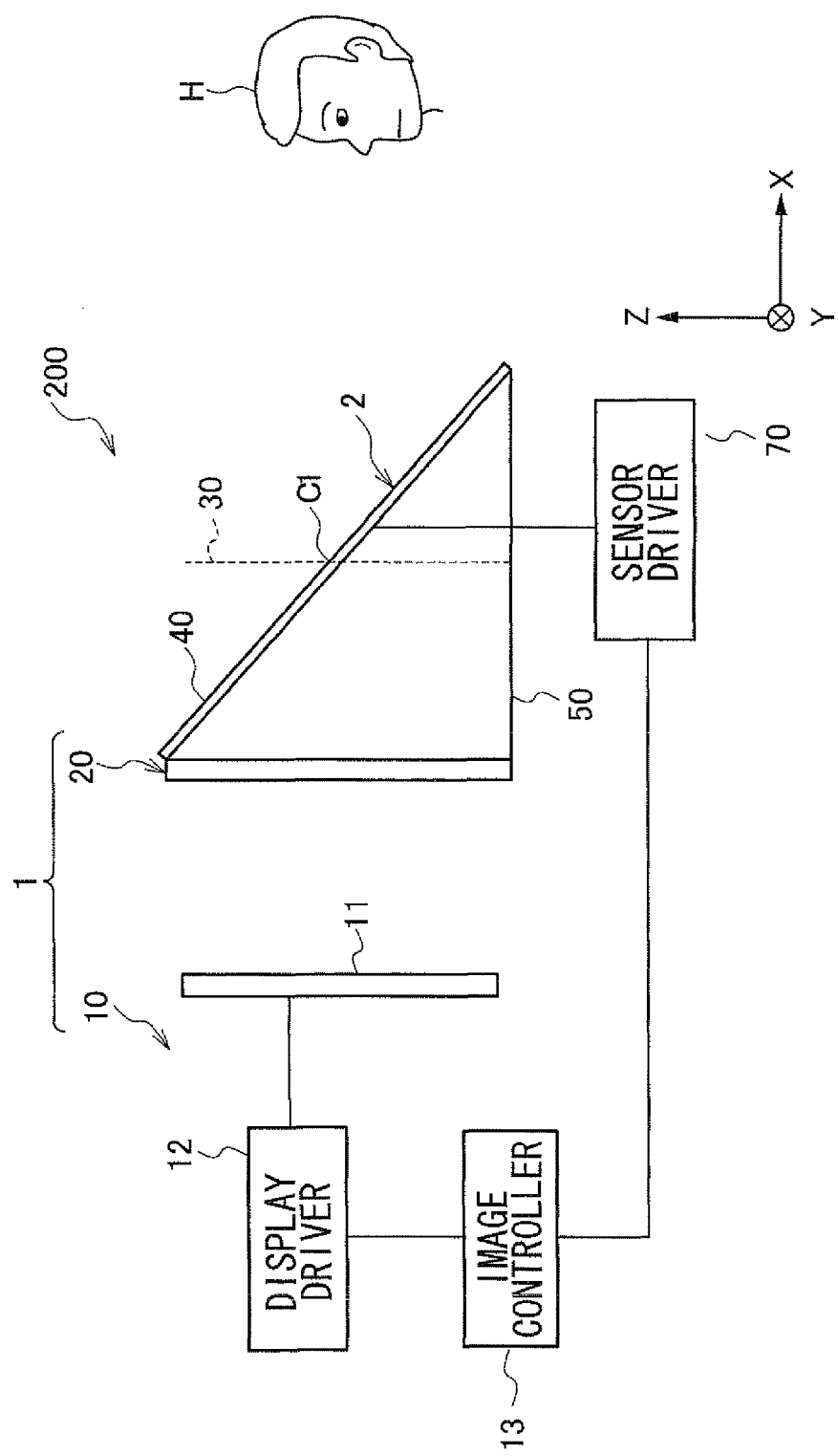

[FIG.18]
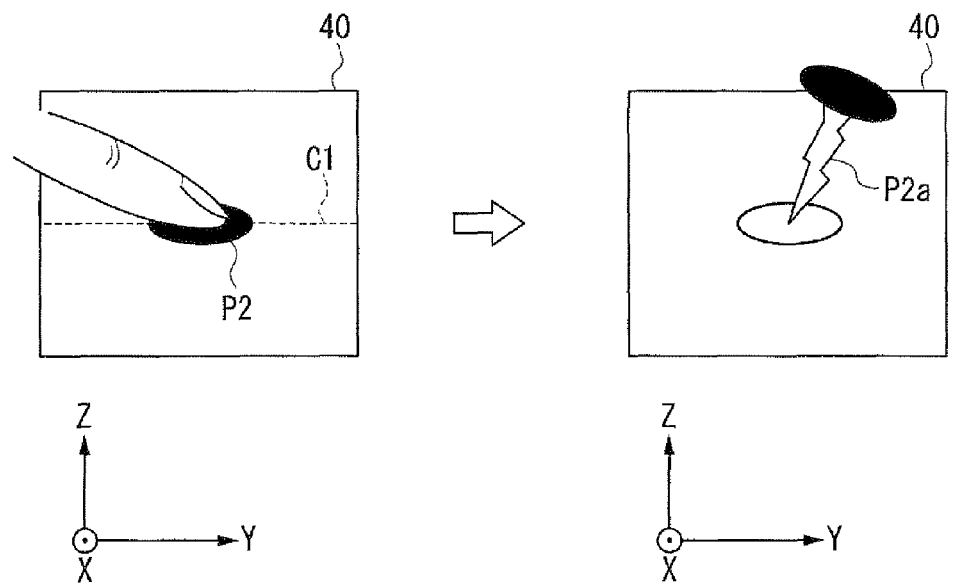
[FIG.19]
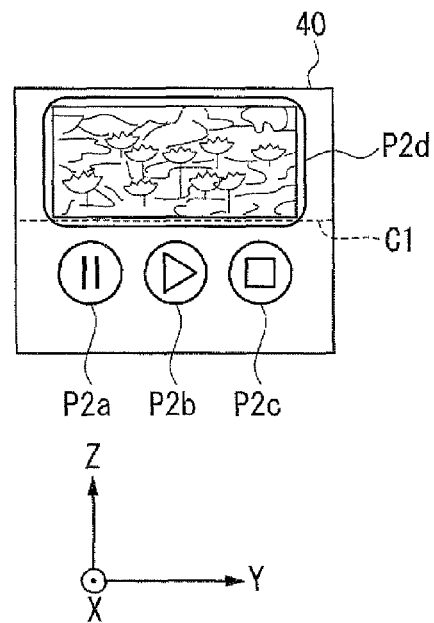

IMAGE DISPLAY DEVICE

This application is the U.S. national phase of International Application No. PCT/JP2007/066232 filed 22 Aug. 2007, which designated the U.S. and the entire contents of which is hereby incorporated by reference.

TECHNICAL FIELD OF THE INVENTION

The present invention relates to image display devices for pseudo-stereoscopically displaying two-dimensional images.

BACKGROUND ART

Recently, various systems for providing viewers stereoscopic images are proposed.

In these types of image display devices, there are common systems that use binocular parallax to thereby provide, as three-dimensional images, two-dimensional images on an image screen of a display or the like.

However, in these systems using the binocular parallax, because a viewer watches a pseudo image as a three-dimensional image of a target object, the focus on the image screen and the convergence are off from each other, the viewer may be subjected to physiological effect.

Thus, as another system, an image display device, in which an image transfer panel (for example, a microlens array consisting of a plurality of lenses) is placed in front of a two-dimensional image at a predetermined space therefrom, for displaying a pseudo stereoscopic image (floating image) of the two-dimensional image onto a space in front of the image transfer panel has been known (for example, see a first patent document and a second patent document).

The image display device is adapted to focus the two-dimensional image by the image transfer panel while floating the two-dimensional image, thus displaying the two-dimensional image as if to display a three-dimensional image.

First patent document: 2001-255493
Second patent document: 2003-098479

DISCLOSURE OF THE INVENTION

Problems To Be Solved By the Invention

The system that provides pseudo stereoscopic images using the image transfer pane set forth above can display floating images in the simple structure, thus improving visual effects.

However, some contents of two-dimensional images may make it difficult to recognize whether corresponding floating images really float, and also difficult to grasp the floating-up quantities.

The present invention has been made to solve the aforementioned circumstances, and has an example of a purpose of providing image display devices that improve the visibilities of floating images.

Means For Solving the Problems

In order to achieve such a purpose provided above, an image display device according to one aspect of the present invention includes a floating image display means including a display unit having an image screen for displaying a two-dimensional image, and an image transfer panel located far from the image screen, the floating image display means being to focus light left from the image screen on an image plane in a space to thereby display a floating image, the space being located on one side of the image transfer panel opposite to the other side thereof facing the display unit. The image display device includes a floating image recognizing means formed of a light-transmissive plate that is light transmissive, the light-transmissive plate having a size that allows all light left from the image screen and focused on the image plane to be passed therethrough, the light-transmissive plate being placed to be obliquely-crossed to the image plane.

BRIEF DESCRIPTION OF THE DRAWINGS

FIG. 1 is an outline perspective view of an image display device according to an embodiment of the present invention;

FIG. 2 is an outline view of the image display device according to the embodiment of the present invention as viewed from its lateral direction;

FIG. 3 is a structural view of an image transfer panel of the image display device according to the embodiment of the present invention;

FIG. 4 is a view describing optical operations of a microlens array that is the image display device according to the embodiment of the present invention;

FIG. 5 is a view describing optical operations of a microlens array having a structure different from that of the microlens array illustrated in FIG. 4;

FIG. 6 is an outline perspective view illustrating a positional relationship between an image plane and a light-transmissive plate of the image display device according to the embodiment of the present invention;

FIG. 7 is a side view illustrating the positional relationship between the image plane and the light-transmissive plate of the image display device according to the embodiment of the present invention;

FIG. 8 is a schematic structural view illustrating the image display device according to the embodiment of the present invention when the light-transmissive plate is supported to be substantially vertical to the ground;

FIG. 9 is a view illustrating modifications of the light-transmissive plate of the image display device according to the embodiment of the present invention;

FIG. 10 is an example of images using a light-transmissive display in place of the light-transmissive plate in the image display device according to the embodiment of the present invention;

FIG. 11 is an example of images that the image display device displays according to the embodiment of the present invention;

FIG. 12 is an example of images that the image display device displays according to the embodiment of the present invention;

FIG. 13 is an example of an image that the image display device displays according to the embodiment of the present invention;

FIG. 14 is an example of images that the image display device displays according to the embodiment of the present invention;

FIG. 15 is an example of images that the image display device displays according to the embodiment of the present invention;

FIG. 16 is an example of images that the image display device displays according to the embodiment of the present invention;

FIG. 17 is a schematic structural view of a modification of the image display device according to the embodiment of the present invention;

FIG. 18 is an example of images to be displayed on the image display device illustrated in FIG. 17; and FIG. 19 is an example of images to be displayed on the image display device illustrated in FIG. 17.

DESCRIPTION OF CHARACTERS

1 Floating image display unit
2 Floating image recognizing unit
10 Display unit
11 Image screen
12 display driver
13 Image controller
20 Image transfer panel
21 Lens array half
22 Transparent substrate
23 Micro convex lens
25 Microlens array
30 Image plane
40 Light-transmissive plate
50 Stationary plate
60 Light-transmissive display
100, 200 Image display device

BEST MODES FOR CARRYING OUT THE INVENTION

An embodiment of the present invention will be described hereinafter with reference to the drawings.

FIGS. 1 and 2 are schematically structural views of an image display device 100 according to an embodiment of the present invention. FIG. 1 is an outline perspective view of the image display device 100, and FIG. 2 is an outline view of the image display device 100 as viewed from its lateral side (A-A direction of FIG. 1); FIG. 2 includes a functional structural view of a display unit 10.

The image display device 100 is a pseudo stereoscopic-image display device for displaying, on a preset plane in a space, a two-dimensional image that is visibly recognizable by a viewer H. The image display device 100 is roughly provided with a floating image display unit 1 having a function of displaying a floating image (a two-dimensional image to be displayed on a preset plane in a space), and a floating image recognizing unit 2 having a function of improving the visibilities of floating images that the floating image display unit displays.

The floating image display unit 1 is made up of a display unit 10, and an image transfer panel 20 located to be spaced from the display unit 10. Note that FIGS. 1 and 2 are figures to demonstrate the positional relationship between the display unit 10 and the image transfer panel 20. The floating image display unit 1 is actually formed as one box-shaped housing enclosing the display unit 10 and the image transfer panel 20 (see (a) of FIG. 6).

The display unit 10 includes an image screen 11 for displaying two-dimensional images, a display driver 12 for drive and control of the display unit 10, and an image controller 13 for generating image data to be displayed on the image screen 11. Specifically, the display driver 12 is adapted to display, on the image screen 11 of the display unit 10, an image corresponding to image data generated by the image controller 13.

For example, as the display unit 10, a color liquid crystal display (LCD) can be used; this LCD is provided with a flat screen 11 and a display driver 12 consisting of an illuminating backlighting unit, a color liquid crystal drive circuit, and so on. Note that another device except for the LCD, such as an EL (Electro-Luminescence) display, a plasma display, and a CRT (Cathode Ray Tube) can be used as the display unit 10. Moreover, for generation of image data, an image storage unit in which predetermined image data has been stored can be provided.

The image transfer panel 20 includes, for example, a microlens array 25 with a panel screen arranged in substantially parallel to the image screen 11 of the display unit 10. The microlens array 25, as illustrated in FIG. 3, is configured such that two lens array halves 21a, 21b are arranged in parallel to each other. Each of the lens array halves 21a, 21b is designed such that a plurality of micro convex lenses 23 are two-dimensionally arranged to be adjacent to each other on either surface of a transparent substrate 22 made from high translucent glass or resin; the micro convex lenses 23 have the same radius of curvature.

An optical axis of each of the micro convex lenses 23a formed on one surface is adjusted such that the adjusted optical axis is aligned with the optical axis of a corresponding micro convex lens 23b formed at an opposing position on the other surface. Specifically, individual pairs of the micro convex lenses 23a, 23b adjusted to have the same optical axis are two-dimensionally arranged such that their respective optical axes are parallel to each other.

The microlens array 25 is placed in parallel to the image screen 11 of the display unit 10 at a position far therefrom by a predetermined distance (a working distance of the microlens array 25). The microlens array 25 is adapted to focus light, corresponding to an image and left from the image screen 11 of the display unit 10, on an image plane 30 on the side opposite to the image screen 11 and far therefrom at the predetermined distance (working distance of the microlens array 25). This focus displays the image displayed on the image screen 11 on the image plane 30 as a two-dimensional plane in a space.

The formed image is a two-dimensional image, but is displayed to float in the space when the image has depth or the background image on the display is black with its contrast being enhanced. For this reason, the front viewer H looks the formed image as if it is floated. Note that the image plane 30 is a virtually set image in the space and not a real object, and one plane defined in the space according to the working distance of the microlens array 25.

Note that an effective area (an arrangement area of micro convex lenses that can effectively form entered light onto the image plane 30) and the arrangement pitches of micro convex lens arrays of the microlens array are floating-image display parameters of the microlens array 21 side. The pixel pitches, an effective pixel area, and brightness, contrast, and colors of images to be displayed on the image screen 11a of the display 11 are floating-image display parameters of the display 11 side. The floating-image display parameters and the floating-image display parameters are optimized so that floating images to be displayed on the image plane 30 are sharply displayed.

This results in that the microlens array 25, as illustrated in FIG. 4, is adjusted to be arranged such that:

light corresponding to an image P1 and left from the image screen 11 of the display unit 10 is incident from the lens array half 21a, flipped thereinside at one time, flipped again, and thereafter, outputted from the lens array half 25b.

This allows the microlens array 25 to display the two-dimensional image P1 displayed on the image screen 11 of the display unit 10 as an erected floating image P2 on the image plane 30.

More specifically, in the light forming the two-dimensional image P1 to be displayed on an image screen 11a, light of an image in a region corresponding to each of the micro convex lenses 23 of the microlens array 25 is captured by each of the micro convex lenses 23, flipped in each of the micro convex lenses 23, flipped again, and outputted so that the floating image P2 is displayed as a set of erected images formed by the respective micro convex lenses 23.

Note that the microlens array 25 is not limited to the structure of a pair of two lens array halves 21a, 21b, and can be configured by a single lens array, or by a plurality of lens arrays equal to or greater than three lens arrays. Of course, when a floating image is formed by odd-numbered, for example, one or three, lens array halves 21, referring to (a) and (b) of FIG. 5, light incident to the micro lens array 25 is flipped at one time therein, and flipped again. For this reason, it is possible to display an erected floating image.

As described above, various configurations of the microlens array 25 can be made. These configurations allow the working distance for forming light to have a constant effective range without limiting the single working distance.

Note that, in the embodiment, the image transfer panel 20 is the microlens array 25, but not limited thereto, and can be any member for forming erected images, desirably erected equal-magnification images. Other forms of lenses, or imaging mirrors or imaging prisms except for lenses can be used.

For example, a gradient index lens array, a GRIN lens array, a rod lens array, or the like can be a microlens array, and a roof mirror array, a corner mirror array, a dove prism or the like can be a micromirror array. One Fresnel lens having a required active area, which forms a reverted image, can be used in place of arrays.

The floating image recognizing unit 2 is provided with a light-transmissive transparent rectangular plate (referred to as light-transmissive plate hereinafter) 40, and a stationary plate 50 used to fixedly support the light-transmissive plate 40 to the floating image display unit 1. In the embodiment, the transparent light-transmissive plate 40 is used, but a semi-transparent light-transmissive plate having a particular color (light blue or the like) can be used as the light-transmissive plate 40. In the embodiment, the light-transmissive plate 40 has a rectangular shape, but the shape is limited thereto. As stationary-plate fixing methods, any method for fixing, to the front surface of the housing of the floating image display unit 1 can be used. For example, a method for engaging the stationary plate 50 with the front surface of the housing of the floating image display unit 1 is estimated.

The light-transmissive plate 40 is made from a material, such as acrylic, polyvinyl chloride, and glass, and placed to be obliquely-crossed to the image plane 30. In the embodiment, as illustrated in FIGS. 1 and 2, the light-transmissive plate 40 is placed to be inclined relative to the front-back direction (X direction) of the viewer H such that it becomes higher (+Z direction) as approaching the image transfer panel 20 (−X direction). Specifically, the light-transmissive plate 40 is supported with respect to the illustrated XY plane at an angle α.

Moreover, when being viewed from the viewer H, the light-transmissive plate 40 physically covers the front surface F of the housing of the floating image display unit 1 (see (a) of FIG. 6) so that at least floating images displayed on the image plane 30 are monitored through the light-transmissive plate 40 by the viewer H.

More specifically, as illustrated in FIGS. 1 and 2, for a floating image to be displayed on the upper side (+Z direction) from the intersection C1 between the image plane 30 and the light-transmissive plate 40, light left from the image transfer panel 20 (light prior to be imaged on the image plane 30) passes through the light-transmissive plate 40. For a floating image to be displayed on the lower side (−Z direction) from the intersection C1 between the image plane 30 and the light-transmissive plate 40, light of the floating image displayed on the image plane 30 (light after being imaged on the image plane 30) passes through the light-transmissive plate 40. This results in that the light of a floating image through the upper side from the intersection C1 and the light of a floating image through the lower side from the intersection C1 reach the eyes of the viewer H through respective different paths (image transfer panel 20→light-transmissive plate 40→image plane 30, and image transfer panel 20→image plane 30→light-transmissive plate 40).

Specifically, in the embodiment, as approach from the upper and lower ends of the image plane 30 to the intersection C1 (vicinity of the center), the image plane 30 and the light-transmissive plate 40 are arranged such that the distance between the image plane 30 and the light-transmissive plate 40 is gradually reduced. The relationship between the image plane 30 and the light-transmissive plate 40 in the front-back direction (the positional relationship therebetween in the X direction) is reversed at the intersection C1 as the boundary. For these reasons, the viewer H can more easily recognize floating images displayed on the image plane 30.

This will be specifically described with reference to (a) of FIG. 7. (a) of FIG. 7 is an outline view of the image display device 100 as it is viewed from one side thereof; this figure illustrates the positional relationship between the image plane 30 and the light-transmissive plate 40.

For example, because the viewer H can observe a floating image P2a displayed on the top of the image plane 30 relative to the position C11 of the light-transmissive plate 40 as a real object (can focus on it relative to the position C11), the viewer H can feel that the floating image P2a is presented before the position C11 (+X direction). Moreover, because the viewer H can observe a floating image P2b displayed on the portion a little higher than the center of the image plane 30 relative to the position C12 of the light-transmissive plate 40 as a real object (can focus on it relative to the position C12), the viewer H can feel that the floating image P2b is presented before the position C12 (+X direction). Because the position C12 is located before the position C11 so that the reference positions for the two floating images P2a and P2b are different from each other, it is possible to more accurately grasp the overall alignment of the floating images (X coordinates).

Similarly, because the viewer H can observe floating images P2c and P2d displayed on the lower side of the image plane 30 relative to the corresponding positions C13 and C14 of the light-transmissive plate 40 as a real object (can focus on them relative to the corresponding positions C13 and C14), the viewer H can feel that the floating images P2c and P2d are presented behind the positions C13 and C14, respectively.

As described above, the image display device 100 according to the embodiment is configured such that the positions of the light-transmissive plate 40 are different according to the location of a floating image displayed on the image plane 30 in the vertical direction (Z direction) of the floating image; these positions serve as the references in monitoring (the reference position is continuously gradually changed in the vertical direction). For this reason, the viewer H more accurately grasps, according to the reference positions, the amount of floating-up of the floating image (X coordinate, such as X1 in (a) of FIG. 7). Specifically, the image display device 100 equipped with the floating image recognizing unit 2 improves the visibilities of the floating images.

Note that, when the light-transmissive plate 40 is placed in parallel to the image plane 30, the viewer H can monitor, through the light-transmissive plate 40, a floating image displayed on the image plane 30. In this case, however, it is possible to only feel that the floating image is presented before the light-transmissive plate 40 (+X direction) or the floating image is presented behind the light-transmissive plate 40 (−X direction). Thus, the exact amount of floating-up of the floating image (X coordinate) cannot be grasped. In this case, even if the locations of the floating image displayed on the image plane 30 are different in its vertical direction (Z direction), the positions of the light-transmissive plate 40, which serve as the references in monitoring, are in agreement with each other. For this reason, the amount of floating-up of the floating image (X coordinate) cannot be determined according to different reference positions.

Note that the positional relationship between the image plane 30 and the light-transmissive plate 40 of the image display device 100 is not limited to the structure set forth above.

Specifically, as illustrated in (a) of FIG. 6, it is not limited to the structure that the light-transmissive plate 40 is placed to be inclined relative to the front-back direction (X direction) such that it becomes higher (+Z direction) as approaching the image transfer panel 20 (−X direction).

For example, referring to (b) of FIG. 6, in an image display device 100A, the light-transmissive plate 40 can be placed to be inclined relative to the front-back direction (X direction) such that it becomes higher (+Z direction) as being away from the image transfer panel 20 (+X direction). In addition, referring to (c) of FIG. 6, in an image display device 100B, the light-transmissive plate 40 can be placed to be inclined relative to the horizontal direction (Y direction) such that it is away from the image transfer panel 20 (+X direction) as going in the left direction (−Y direction).

In place of the single light-transmissive plate 40, a plurality of light-transmissive plates 40 can be placed to be obliquely-crossed to the image plane 30. For example, referring to (b) of FIG. 7, in an image display device 100C, two light-transmissive plates 40 can be configured to be V-shaped. In addition, the light-transmissive plate 40 can be designed as a curved plate. For example, referring to (c) of FIG. 7, an image display device 100D can be provided with the curved light-transmissive plate 40.

In the image display device 100, the light-transmissive plate 40 can be placed to be obliquely-crossed to the image plane 30 formed to be vertical to the ground. In an opposite manner from this, referring to FIG. 8, an image display device 100E can be designed such that the image plane 30 is placed to be obliquely-crossed to the light-transmissive plate 40 arranged to be perpendicular to the ground. In this case, as illustrated in FIG. 8, because the display unit 10 of a floating image display unit 1E is arranged to obliquely stand on the ground, the image plane 30 is obliquely arranged with respect to the ground (the image screen 11 and the image plane 30 are located to be symmetrical to the image transfer panel 20 arranged to be substantially vertical to the ground).

In addition, a transparent plate as the light-transmissive plate 40 can be subjected to predetermined shapes, patterns, colors, or the like. In this case, the formed predetermined shapes, patterns, colors, or the like can emphasize the presence of the light-transmissive plate 40. Thus, the viewer H can reliably recognize the presence of the light-transmissive plate 40 as the reference in monitor of a floating image.

For example, as illustrated in (a) of FIG. 9, in a light-transmissive plate 40A, a predetermined-colored line L1 is drawn on the proximity of each of the right and left ends of the light-transmissive plate 40 so as to extend in the top-bottom direction; this light-transmissive plate 40A can be used. As illustrated in (b) of FIG. 9, in a light-transmissive plate 40B, a predetermined-colored line L2 is drawn, in the right and left direction, up to the proximity of each of the right and left ends of the light-transmissive plate 40; this light-transmissive plate 40B can be used.

Because the viewer reliably recognizes the presence of the light-transmissive plate 40 based on the lines drawn on the light-transmissive plate 40A or 40B, it is possible to improve the visibility of floating images. Note that the location of a line to be drawn on a light-transmissive plate is not limited to the proximity of the periphery of the light-transmissive plate, it can be drawn on any location so long as the line and a floating image displayed on the image plane 30 are not overlapped with each other as being viewed from the viewer H.

Referring to (c) of FIG. 9, a predetermined pattern (for example, a cobweb-like pattern L3) can be drawn on the light-transmissive plate 40, and a floating image associated with the predetermined pattern, such as an image illustrating a butterfly caught by in a cobweb) can be displayed. The viewer H can recognize the presence of the light-transmissive plate 40. Note that the lines and pattern set forth above are not limited to two-dimensionally drawn ones. As lines and patterns, roughened shapes can be formed by, for example, engraving so as to be made as lines or patterns. In this case, irradiation of a light source, such as an LED, from one side edge surface allows the lines or patterns to glow to thereby effectively highlight the lines or patterns. This highlight makes it possible for the viewer H to recognize the presence of the light-transmissive plate 40.

In addition, the aforementioned light-transmissive plate 40 is a transparent plate, but a transparent light-transmissive display, such as an EL display, 60 can be used in place of the transparent plate. For example, as illustrated in FIG. 10, a Japanese map image can be illustrated on the light-transmissive display 60 and, as a floating image P2, weather marks, such as cloudy and rain, can be displayed. Note that, when the light-transmissive display 60 is used in place of the light-transmissive plate 40, because the light-transmissive display 60 can dynamically display two-dimensional images, it is possible to display floating images each associated with dynamically displayed two-dimensional images. For example, while the Japanese map image illustrated in FIG. 10 is changed (another area map is displayed), the appearance of the weather of the displayed area can be displayed as a floating image.

Hereinafter, an example of video contents to be displayed by the image display device 100 according to the embodiment will be described.

FIG. 11 is a view illustrating motions of a floating image when a spherical object is displayed as the floating image. As illustrated in (a) to (c) of FIG. 11, when the spherical object (floating image) P2 moves from the top to bottom in the image plane 30, the spherical object P2 is changed in color between the area higher than the intersection C1 as the boundary and the area lower than the intersection C1. For example, when the spherical object P2 colored in red in the higher area moves into the lower area, the brightness is reduced so that it comes in dark red. Specifically, in order to express that the spherical object P2 falls down from top to pass through the light-transmissive plate 40, when entering the area lower than the intersection C1, the object P2 becomes darkened so as to highlight the entrance into the back side of the light-transmissive plate 40. As described above, the image display device 100 is capable of carrying out the expression of passing the plate as a pseudo three-dimensional image; the expression is an improbable expression using real objects.

Note that, as the expression of the spherical object P2 crossing the light-transmissive plate 40, in addition to the display that it passes through the light-transmissive plate 40 to move the back side of the light-transmissive plate 40, the display of the object P2 at the moment when it hits the light-transmissive plate 40 can be more effective. For example, the expression that ripple appears at the moment when the object P2 has just hit the light-transmissive plate 40 can be performed using floating images. The expression that a hole passable by the object is formed at the moment when the object P2 hits the light-transmissive plate can be performed using floating images. The expression that the light-transmissive plate 40 is broken at the moment when the object P2 has just hit the light-transmissive plate 40 can be performed using floating images.

For example, in order to express that ripple appears at the moment when the object P2 has just hit the light-transmissive plate 40, as illustrated in (a) of FIG. 12, a floating image of ripple P2a is displayed simultaneously when the moving spherical object P2 crosses the intersection C1. In order to express that a hole passable by the object P2 is formed at the moment when the object P2 hits the light-transmissive plate, as illustrated in (b) of FIG. 12, a floating image of a hole P2b is displayed simultaneously when the moving spherical object P2 crosses the intersection C1. In order to express that the light-transmissive plate 40 is broken at the moment when the object P2 has just hit the light-transmissive plate 40, as illustrated in (c) of FIG. 12, a floating image indicative of the light-transmissive plate 40 being broken to crack is displayed simultaneously when the moving spherical object P2 crosses the intersection C1.

Referring to FIG. 13, using a light-transmissive plate 40D formed with an actual hole 41 can express the moment when the spherical object P2 crosses the light-transmissive plate 40.

Specifically, using the light-transmissive plate 40D formed at its part with a hole allows the spherical object P2 to physically pass through the hole 41 of the light-transmissive plate 40D (when the spherical object P2 passes through the hole 41 of the light-transmissive plate 40D, the viewer H can monitor it without via the light-transmissive plate 40D.

In order to express that the spherical object P2 crosses the light-transmissive plate 40, the expression that it bounces off the light-transmissive plate 40 after the hit to the light-transmissive plate 40 can be used in addition to the expression that it passes through the light-transmissive plate 40 to move into the back side thereof. For example, as illustrated in FIG. 14, when the spherical object P2 moving from the top to bottom crosses the intersection C1, a floating image P2a indicative of oscillations due to the hit can be displayed, and thereafter, the spherical object P2 can be moved upwards.

As described above, when displaying a moving predetermined object as a floating image, the image display device 100 changes the content of the floating image based on the positional relationship between the object and the intersection C1 (whether it is located at the area higher than the intersection C1, at the area lower than the intersection C1, or on the intersection C1), making it possible to provide the viewer H more interest floating images.

A floating image to be displayed on the area higher than the intersection C1 on the image plane 30 and a floating image to be displayed on the area lower than the intersection C1 can have different implications, respectively. For example, as illustrated in (a) of FIG. 15, a floating image displayed on the lower area is an inactive object P2a, such as a menu and a title, and a floating image displayed on the higher area is an active object P2b, such as a menu and a title; this active object is being presently selected. (a) of FIG. 15 represents that the folder B is being selected. An object can be changed in color between areas divided by the intersection C1. For example, as illustrated in (b) of FIG. 15, when a plurality of values of parameters are dynamically displayed at the same time in the form of a bar graph, the bar graph can be changed in color across the intersection boundary C1.

Note that the aforementioned image display device 100 can be applied to the display for meters and gauges in mobile objects, such as motor vehicles, and, for example, it can be applied to the display of a fuel meter illustrated in FIG. 16. A transparent acrylic board for protecting the fuel meter is used as the light-transmissive plate 40 to be obliquely-crossed to the image plane 30. In normal display indicative of fuel being enough, a fuel meter P2 is displayed as a floating image. In contrast, in warning display indicative of fuel being low, an enlarged fuel pump P2a is displayed as a floating image in addition to the fuel meter P2 so that the fuel pump P2a pops up with its size being increased. This popped-up floating image allows the driver to reliably recognize the warning. As described above, when the image display device 100 is applied to the display for meters and gauges in mobile objects, it is possible to display a floating image in large scale while popping up from the image-transmissive plate 40 to thereby display a warning. Thus, it is possible to reliably give the driver an abnormal situation.

In addition, a sensor portion, such as a touch panel, can be mounted on the light-sensitive panel 40 of the image display device 100 to thereby provide an image display device adapted to interactively display floating images according to instructions by the viewer H. FIG. 17 is a schematic structural view of such an image display device 200.

The image display device 200 includes a sensor portion (not shown) and a sensor driver 70 that drives the sensor portion and receives detection signals from the sensor portion. Specifically, the viewer's operations can be detected by the sensor portion on the light-transmissive plate 40, and a floating image can be changed according to the detected signals.

FIG. 18 is an example of images to be displayed on the image display device 200. An image illustrated in FIG. 18 shows, as a floating image, a button P2 at the approximately center (proximity of the intersection C1) of the light-transmissive plate 40. Touching the button P2 (specifically, the sensor portion located almost at the center of the light-transmissive plate 40) by the viewer H causes it to vary as a floating image P2a in which a button has floated out.

Note that the image display device 200 is configured such that the sensor portion is mounted on the light-transmissive plate 40, but is not limited thereto. A position sensor can be provided to detect that the viewer H touches a floating image (position coordinates in the image plane 30). FIG. 19 is an example of images when such a position sensor is provided. The image illustrated in FIG. 19 shows, as floating images, a plurality of operation buttons P2a, P2b, and P2c as floating images (for example, pause-operation, playback-operation, and stop-operation buttons) in the area lower than the intersection C1. The image illustrated in FIG. 19 shows, as a floating image, a video content P2d in the area higher than the intersection C1. Touching any one of the operation buttons by the viewer H causes the image display device 200 to carry out operations corresponding to the operated button (specifically, when the position sensor detects the position coordinates on the image plane 30, respective functions according to the detected position coordinates are carried out). For example, touching the playback button P2b by the viewer H causes the image display device 200 to playback the video content P2d as a floating image, and touching the stop button P2c by the viewer H causes the image display device 200 to stop the playback of the video content P2d displayed as a floating image.

As described above, the image display device 100 according to the embodiment includes the floating image display unit 1 and the floating image recognizing unit 2. The floating image display unit 1 includes the display unit 10 having the image screen 11 for displaying two-dimensional images, and the image transfer panel 20 located far from the image screen 11. The image display device 100 is configured to focus light left from the image screen 11 on the image plane 30 in a space to thereby display a floating image; this space is located on one side of the image transfer panel opposite to the other side thereof facing the display unit.

The float image recognizing unit 2 is made up of the light-transmissive plate 40, and the light-transmissive plate 40 has a size that allows all light left from the image screen 11 and imaged on the image plane 30 to be passed therethrough. The float image recognizing unit 2 is placed to be obliquely-crossed to the image plane 30. Thus, it is possible to improve the visibility of floating images. Specifically, it is possible to eliminate the problems that it is difficult to recognize whether floating images really float and to grasp the corresponding floating-up quantities.

The embodiment of the present invention has been described above, but the present invention is not limited to the embodiment set forth above, and the embodiment can be variously deformed or changed; these various deformations and changes are within the scope of the present Invention.

The invention claimed is:

1. An image display device comprising:
   a floating image display means comprising:
   a display unit having an image screen for displaying a two-dimensional image; and
   an image transfer panel located far from the image screen, the floating image display means being configured to focus light left from the image screen on an image plane in a space to thereby display a floating image, the space being located on one side of the image transfer panel opposite to the other side thereof facing the display unit; and
   a floating image recognizing means formed of a plate-like light-transmissive member that is light transmissive, the plate-like light-transmissive member having a size that allows all light left from the image screen and focused on the image plane to be passed therethrough,
   wherein the plate-like light-transmissive member is placed to cross the image plane such that the image plane is divided into a first region and a second region, the plate-like light-transmissive member having a surface that faces the first and second regions, the plate-like light-transmissive member comprising an engraved portion formed on first and second parts of the surface, each of the first and second parts of the surface facing a corresponding one of the first and second regions, the engraved portion formed on each of the first and second parts of the surface serving as a reference portion with respect to the floating image of a corresponding one of the first and second regions of the image plane.

2. The image display device according to claim 1, wherein the floating image is made up of a first floating image and a second floating image, and the display unit controls a content of the two-dimensional image so as to display the first and second floating images on two areas on the image plane, respectively, the first and second floating images having different implications, respectively, the two areas being divided by an intersection between the image plane and the plate-like light-transmissive member.

3. The image display device according to claim 1, wherein, when a predetermined moving object is to be displayed as the floating image, the display unit controls a content of the two-dimensional image so as to change a content of the floating image according to a positional relationship between the object to be displayed and an intersection between the image plane and the plate-like light-transmissive member.

4. The image display device according to claim 1, wherein the plate-like light-transmissive member is a light-transmissive display that is light transmissive, the light-transmissive display being configured to display a two-dimensional image.

5. The image display device according to claim 1, further comprising a position detecting means that detects a position of an object to detection as a part of a viewer,
   wherein the display unit changes a content of the two-dimensional image according to the position of the object to detection detected by the position detecting means.

6. The image display device according to claim 1, wherein the plate-like light-transmissive member has at its part a hole, a part of the light focused on the image plane does not pass through the plate-like light-transmissive member.

7. The image display device according to claim 1, wherein the image transfer panel is a microlens array that causes the light left from the image screen to be incident, the incident light being flipped thereinside, and causes the flipped light to flip again and externally output it to thereby focus an erected equal-magnification image on the image plane.

8. The image display device according to claim 1, wherein the plate-like light-transmissive member has a semitransparent color.

* * * * *